Inventors: Petrus W. M. M. de Jong
Hendrik G. van Huis
Jacob Ridderikhoff
By: Oswald H. Milmore
Their Attorney Inventors: Petrus W. M. M. de Jong
Hendrik G. van Huis
Jacob Ridderikhoff
By: Oswald W. Milmore
Their Attorney

UNITED STATES PATENT OFFICE 2,623,576

CUTTING TORCH WITH INCLINED AND OFFSET CUTTING OXYGEN DISCHARGE PASSAGE

Petrus W. M. M. de Jong, Hendrik G. van Huis, and Jacob Ridderikhoff, Delft, Netherlands, assignors to Shell Development Company, San Francisco, Calif., a corporation of Delaware Application January 24, 1949, Serial No. 72,324
In the Netherlands January 28, 1948

6 Claims. (Cl. 158—27.4)

This invention relates to severing bodies of metal or the like by means of a flame and an isolated jet of oxygen, and is particularly, although not exclusively, concerned with making cuts which are oblique to the surface of the body.

It is known to make cuts in sheet metal by means of a heating flame and a separate oxygen jet, often known as the oxygen cutting process. (See U. S. patent to Smith, No. 2,258,340.) When such method is used to make oblique cuts it is usual practice to position the cutting torch with its axis at an angle corresponding to the desired cutting angle, e. g., 45°, the torch being normally provided with a compound nozzle having a central channel and a central orifice for the cutting oxygen and an annular channel connected to an annular orifice concentrically surrounding the former, for the combustible gaseous mixture supplying the preheating flame, e. g., a mixture of a hydrocarbon and oxygen. Such a process presents few difficulties if acetylene is used as the heating gas in the gaseous mixture, provided that the deviation of the torch axis from the perpendicular to the metal surface is not too great. However, when combustible mixtures yielding lower flame temperatures are used, e. g., mixtures containing propane as the fuel and/or containing low purity oxygen, it is found that cutting with the torch in the oblique position cannot be effected easily if the deviation of the torch axis from a position perpendicular to the sheet surface is more than about 30°. This may be ascribed to the fact that when the preheating flame is directed obliquely onto the metal sheet, this sheet is not heated locally to the required high temperature, as a large portion of the heat is dissipated. When directing the preheating flame obliquely onto the sheet, the portion of the sheet surface swept by the flame increases and, moreover, the distance from the sheet to the nozzle is not uniform but is different for different points on the flame-swept portion of the sheet surface, so that a large part of said flame-swept portion is not within the highest flame temperature zone. As a result, when gaseous mixtures producing lower flame temperatures are used, the place which is to be cut is not sufficiently preheated to insure the rapid burning away of the metal by oxygen jet.

Torches using an oxygen jet disposed externally to preheating flame and at a slight angle to the flame axis have also been proposed. (See U. S. patent to Knapp, No. 1,000,018.) Such torches were not, however, suitable or intended for effecting cuts of high obliquity, e. g., greater than about 30°, and use flames and oxygen jets which lie in a common plane.

It is an object of this invention to provide an improved oxygen cutting torch whereby flat or curved metal sheet material and the like, particularly sheet iron and especially sheets of high carbon steel, may be cut obliquely in cases where this would otherwise be impossible or impracticable because of the nature of the combustible mixture and/or the high degree of obliquity required.

A further object is to provide an improved oxygen cutting torch whereby highly oblique cuts can be made in sheet metal, such as iron, while employing a gas such as propane or town gas as the fuel.

Another object is to provide an improved cutting torch for making oblique cuts with an oxygen cutting jet which can be readily adjusted to adapt it to make cuts of different obliquities and/or for cutting sheets of different thicknesses.

A specific object is to provide a torch having a turret-like cutter provided with a plurality of nozzles for cutting oxygen, arranged for selectively connecting any one of the nozzles to a source of oxygen, whereby a rapid change of cutting nozzles can be effected for making cuts of different, predetermined obliquities and/or for discharging jets of cutting oxygen of predetermined sizes, suitable for cutting sheets of different thicknesses.

Still another object of the invention is to improve the cutting of sheet metal and the like by the oxygen cutting method by insuring that the jet of cutting oxygen is impinged upon the preheated sheet metal in such relation to the preheating flame that the cutting oxygen is utilized to greater advantage than in the conventional cutting methods. More particularly, according to one feature of the invention, which is suitable even for making cuts which are not oblique, the jet of cutting oxygen is impinged against the heated surface in the immediate vicinity of the preheating flame but slightly offset therefrom so as to be outside of the flame, the offset being in a direction along the line cut to be made in the sheet.

Briefly, according to the present invention, the preheating flame is directed toward the sheet to be cut substantially perpendicularly to its surface, regardless of the obliquity of the cut, and the oxygen jet is directed against said surface in the immediate vicinity of the flame and at an angle to the axis of the flame corresponding to the desired obliquity, e. g., an angle greater than 30°, e. g., up to 70°, while the torch and sheet are moved with respect to each other in a direction perpendicular to the axes of the preheating flame and the oxygen jet. For convenience, the term "obliquity" will, in this specification and claims, be used to denote the deviation of the axis of the oxygen cutting jet from a line perpendicular to the surface of the sheet being cut. The preheating flame is preferably positioned to have an obliquity not in excess of 15°.

The torches for carrying out this process may be designed in different ways, depending upon special requirements, e. g., according to whether they are intended for hand or machine operation. In general, they comprise a nozzle for supplying a combustible mixture to the preheating flame, the latter being directed substantially perpendicularly against the surface; and a separate nozzle, either within or external to the former, for supplying a jet of cutting oxygen against the surface at the desired obliquity, in excess of 30°. The axis of the oxygen jet should be skew with respect to the axis of the flame.

The relative movement of torch and sheet is such that the oxygen jet impinges on portions of the surface which were previously heated by the flame; thus, when the torch is moved, the preheating flame leads the oxygen jet, and when the sheet is moved with respect to a stationary torch the sheet is moved toward the oxygen jet. Such a skew or offset relation between the axes of the preheating flame and oxygen jet may be applied also to making cuts having obliquities smaller than 30°, e. g., cuts which are perpendicular to the surface. This offset relationship was found in all cases to result in the most efficient utilization of cutting oxygen.

The invention will be understood more fully by reference to the accompanying drawings forming a part of this specification and showing certain illustrative embodiments, wherein.

Figure 1:
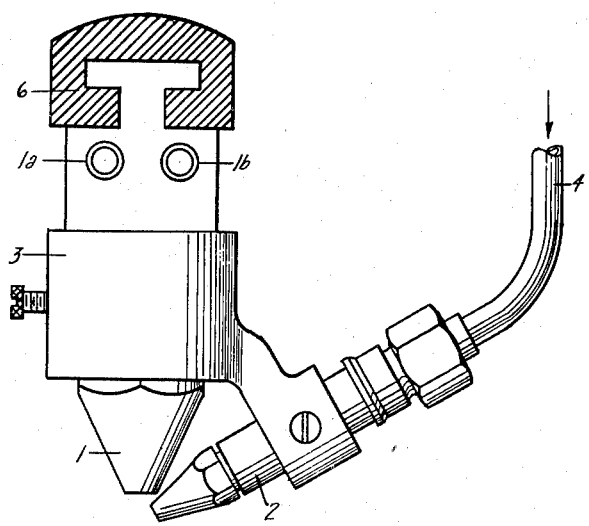
Figs. 1 and 2 are, respectively, an elevation and a bottom plan view of a torch using an external nozzle for directing an oxygen jet disposed in skew relation to the preheating flame and suitable for hand or machine cutting.
Figure 2:
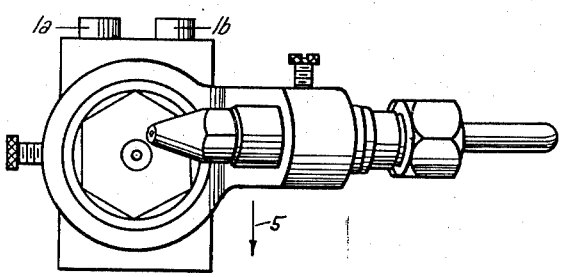

Referring to Figs. 1 and 2, the torch head comprises a burner nozzle 1 of the usual construction employed for making perpendicular cuts. In this case, however, the burner nozzle is only used for preheating and is, therefore, not supplied with cutting oxygen but only with a mixture of oxygen and heating gas, e. g., propane or town gas, fed to the nozzle from the top through suitable separate flexible hose connections, not shown, secured to fitting 1a and 1b. The combustible gaseous mixture is discharged as an axial jet through the nozzle orifice shown in Fig. 2. A separate cutting nozzle 2 having a discharge orifice, shown in Fig. 2, for the cutting oxygen is fixed to the head by means of a clamp 3, secured by set screws, as shown. In the embodiment shown, the cutting nozzle 2 is positioned at an angle of 60° to the axis of the burner nozzle 1 and the jet of cutting oxygen discharged therefrom has its axis inclined 60° to the axis of the jet from the burner nozzle. Further, as shown in Fig. 2, it is offset slightly. Cutting oxygen is supplied through pipe 4. The head may be supported by track 6.

The combustible mixture issuing from nozzle 1 being ignited, and cutting oxygen being supplied to pipe 4, the torch is positioned with the axis of the nozzle 1 perpendicular to the surface of the sheet to be cut and at a distance to bring the surface within the hottest part of the flame. The torch is then moved by hand or by machine in the direction indicated by the arrow 5 in Fig. 2, i. e., perpendicular to the axes of the flame and/or the oxygen jet. (Alternatively, the torch may remain stationary and the sheet be moved in the opposite direction.) The oxygen jet follows immediately behind the preheating flame and cuts the heated metal or other hard material by oxidation thereof, forming a cut at an angle corresponding to the obliquity of the oxygen jet, viz., at an obliquity of 60° in the embodiment shown (i. e., 30° to the sheet surface) when the torch head is maintained perpendicular to the surface. If a different angle is desired, e. g., 45°, the entire head may be tilted through an angle of 15°, as such a deviation from the perpendicular does not usually adversely affect the cutting process.

The clamp 3 may, if desired, be replaced by another clamp of similar construction, or the connection between the torch head and the oxygen nozzle may be made adjustable, e. g., by incorporating a hinged clamp so as to permit angular adjustment between the head and the nozzle for example, as shown in U. S. patent to Wagner, No. 2,202,130.

As the quantity of cutting oxygen to be used depends upon the thickness of the sheet to be cut, the nozzle 2 is preferably provided with a replaceable nipple or with a plurality of interchangeable nipples, as is known per se in the art (see e. g., the above-cited patent to Knapp) so that the size of the outlet orifice can be readily varied.

Figure 3:
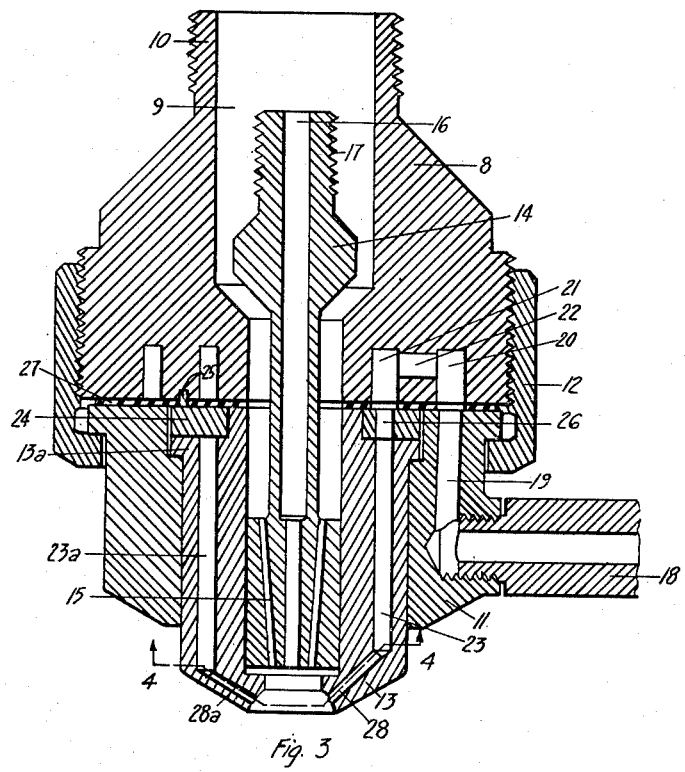
Fig. 3 is a vertical sectional view of a modified form employing a compound nozzle, the axis of the oxygen jet being in skew position with respect to the axis of the preheating flame, and particularly adapted for machine cutting, corresponding to section line 3—3 of Fig. 4.
Figure 4:
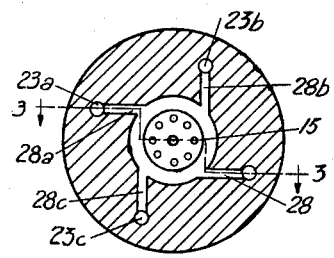
Fig. 4 is a horizontal sectional view taken on line 4—4 of Fig. 3.

The torch according to Figs. 3 and 4 is constructed to permit use under a variety of conditions, i. e., for making a cut of any one of a number of predetermined obliquities. This torch, further, may be constructed to provide a plurality of nipples of different cross-sectional areas as required for cutting metal sheets of different thicknesses. In this torch the nozzle for the mixture supplying the preheating flame and the cutting oxygen nozzle are combined into one compound head. The torch comprises a main body 8 with a bore 9, threaded at the rear at 10 for connection to a source of heating gas and oxygen. The head 11 is fixed to the body by a cap nut 12, and a rotatable cutter 13, of barrel-like shape, is centrally positioned within the head, being retained by an annular flange 13a extending into a groove in the head. The central bore of the cutter 13 provides a channel which is a continuation of the bore 9 of body 8 and serves to hold a tubular preheating or burner nozzle member 14. The nozzle member 14 has at its end a circle of channels 15 through which the combustible mixture of oxygen and heating gas is ejected against the work piece to be cut. The nozzle 14 may, optionally, be provided with a central bore 16, extending rearwardly to a threaded head 17 which may be connected to a source of oxygen (not shown) through which cutting oxygen can be admitted and discharged against the work piece centrally within the flame when perpendicular cuts are required. If it is desired to use the torch only for making oblique cuts this central bore 16 may be omitted.

A conduit 18 for cutting oxygen is threadedly connected to the head 11 and communicates by bore 19 with an annular groove 20 in the body 8. A second annular groove 21 in the lower face of body 8 is in communication with the first groove through channels 22. The cutter 13 has a plurality of channels 23, 23a, etc., extending vertically through its annular wall, and adapted to be selectively placed into communication with the groove 21. A ring 24 is mounted above the channels 23 and is retained against rotation by any suitable means, such as a pin 25. It has only one vertical hole 26, shown opposite channel 23. By rotation of the cutter 13 anyone of the channels 23, 23a, etc., may be selectively brought into juxta-position with the hole 26 and, hence, into flow communication with the conduit 18. A sealing gasket 27 may be placed at the lower face of the body 8.

Each channel 23, 23a, etc., communicates at its lower end with an inclined channel 28, 28a, etc. Each channel 28, 28a, etc., forms an orifice of a separate cutting nozzle, the several cutting nozzles having different conformations, differing in inclination to the axis of the head and/or in cross-sectional area. Thus, the channel 28 is shown to have an inclination of 45° to the center line of the torch and of the nozzle member 14, while channel 28a is disposed at a different angle, e. g., 60°. Other channels 28b and 28c, shown in Fig. 4, may have still different inclinations, or have the same angles as those of channels 28 and 28a but be of different, viz., smaller cross-sectional areas, for cutting metal sheets of different, viz. smaller thickness. Thus the cutter 13 forms a turret-like body having a plurality of different cutting nozzles.

If a cutting channel other than channel 28 is to be used, the cap nut 12 is partially loosed and the cutter 13 is rotated with respect to the ring 24 and body 8 until the appropriate channel is opposite the hole 26 and can be supplied with cutting oxygen, all other channels being then out of communication with the source of cutting oxygen. It is thereby possible to open the particular channel which is desired in view of the thickness of the sheet and the cutting angle.

The axis of each channel 28, 28a, etc. and the axis of the preheating flame are disposed in a skew or offset relation in the manner previously described for Figs. 1 and 2. This disposition is shown in Fig. 4, wherein the channels 28, 28a, etc., appear to be disposed tangentially with respect to a circle beneath the channels 15, viz. the circumscribed circle of the preheating flame. Since only one of these channels is, at any one time, supplied with cutting oxygen, it follows that the relation between the preheating flame and the oxygen jet is the same as that in Figs. 1 and 2.

The torch according to Figs. 3–4 is used as previously described. By suitably positioning the torch in a cutting machine (not shown) the movement of the torch and the work piece with respect to each other is again adjusted so that the relative movement of the torch and metal sheet is in a direction perpendicular to the center lines of the flame and of the oxygen jet, respectively, the direction of movement being such that the oxygen jet passes over a portion of the sheet surface which is previously preheated by the flame.

It has been found that by operating according to the process described herein, using a heating gas such as propane, which has a low flame temperature as compared with acetylene, sheet iron can be cut easily in an oblique direction greater than 30°, up to obliquities of 70°. It is obvious that the apparatus is also suitable for cutting pipes and other bent objects, as well as flat sheet iron.

We claim as our invention:

1. A cutting torch for making oblique cuts in metallic bodies by means of a preheating flame burning a heating gas and a cutting oxygen jet, comprising, in combination: a central burner nozzle having an orifice for directing a jet of combustible gaseous mixture against a surface of said body; means for supplying heating gas and oxygen to said burner nozzle; an annular cutter surrounding at least the tip of said nozzle; a plurality of channels within the cutter for the passage of cutting oxygen, each of said channels having an orifice opening toward the space forwardly with respect to the burner nozzle and in the immediate vicinity of said jet and disposed to direct a jet of cutting oxygen in a direction inclined with respect to the axis of said jet of combustible gaseous mixture, said orifices having different conformation; and means for selectively supplying cutting oxygen to said channels.

2. A cutting torch for making oblique cuts in metallic bodies by means of a preheating flame burning a heating gas and a cutting oxygen jet, comprising, in combination: a body member; a central burner nozzle on said body member having an orifice for directing a jet of combustible gaseous mixture against a surface of said body; means for supplying heating gas and oxygen to said burner nozzle; a cutter having an annular wall surrounding at least the tip of said nozzle and rotatable with respect to said body member; a plurality of channels within the wall of said cutter for the passage of cutting oxygen, each of said channels having an inlet near said body portion and having an outlet orifice opening toward the space forwardly with respect to the burner nozzle and in the immediate vicinity of said jet and disposed to direct a jet of cutting oxygen in a direction inclined with respect to the axis of said jet of combustible gaseous mixture, said outlet orifices having different conformations; and a channel in said body member for the passage of cutting oxygen disposed near said inlets of the channels in the cutter and arranged for the selective registering with said inlets, whereby cutting oxygen can be selectively admitted to said channels in the cutter dependent upon the rotational position of the cutter.

3. The cutting torch according to claim 1 wherein the axes of the orifices in the cutter are skew with respect to the axis of the jet of combustible gaseous mixture and offset sufficiently to cause the jet of cutting oxygen to lie entirely outside of the jet of combustible gaseous mixture.

4. A cutting torch for making oblique cuts in metallic bodies by means of a preheating flame burning a heating gas and a cutting oxygen jet, comprising in combination: a burner nozzle having a discharge orifice for directing a jet of combustible gaseous mixture against a surface of said body; means for supplying heating gas and oxygen to said burner nozzle; a cutting nozzle supportedly connected to said burner nozzle having an orifice disposed for directing an isolated jet containing only cutting oxygen against said surface into the immediate vicinity of said jet of combustible mixture inclined at an angle of more than 30° to the axis thereof and offset from said jet in a direction perpendicular to a plane through the isolated jet that is parallel to the jet of combustible mixture to direct the jet of cutting oxygen entirely outside of the jet of combustible mixture; and means for supplying oxygen to said cutting nozzle.

5. A cutting torch for making oblique cuts in metallic bodies by means of a preheating flame burning heating gas and a cutting oxygen jet, comprising, in combination: a central burner nozzle having a discharge orifice for directing a jet of combustible gaseous mixture against a surface of said body; means for supplying heating gas and oxygen to said burner nozzle; a cutter having an annular wall surrounding at least the tip of said nozzle and rotatable with respect to said nozzle; a channel within the wall of said cutter for the passage of cutting oxygen, said channel having an orifice opening toward the space forwardly with respect to the burner nozzle and disposed to direct an isolated jet containing only cutting oxygen in a direction inclined with respect to the axis of said jet of combustible gaseous mixture and offset from said mixture jet in a direction perpendicular to a plane through the isolated jet that is parallel to the jet of combustible mixture to direct the jet of cutting oxygen into the immediate vicinity but entirely outside of said jet of combustible mixture; and means for supplying cutting oxygen to said channel.

6. The cutting torch according to claim 5 wherein the orifice of the channel in the cutter is so disposed that the axis of the isolated jet of cutting oxygen is inclined more than 30° with respect to the axis of the jet of combustible gaseous mixture.

PETRUS W. M. M. DE JONG.
HENDRIK G. VAN HUIS.
JACOB RIDDERIKHOFF.

REFERENCES CITED

The following references are of record in the file of this patent:

UNITED STATES PATENTS

| Number | Name | Date |
|---|---|---|
| 874,666 | Gauthier et al. | Dec. 24, 1907 |
| 1,000,018 | Knapp | Aug. 8, 1911 |
| 1,084,692 | Bucknam | Jan. 20, 1914 |
| 1,097,263 | Reich | May 19, 1914 |
| 1,247,791 | Carlson | Nov. 27, 1917 |
| 1,604,890 | Eastman et al. | Oct. 26, 1926 |
| 2,202,130 | Wagner | May 28, 1940 |
| 2,407,972 | Aitchinson | Sept. 24, 1946 |
| 2,483,742 | Thurman | Oct. 4, 1949 |

FOREIGN PATENTS

| Number | Country | Date |
|---|---|---|
| 121,368 | Great Britain | Dec. 19, 1918 |
| 300,705 | Germany | May 31, 1919 |
| 466,749 | Germany | Oct. 13, 1928 |
| 651,539 | Germany | Oct. 15, 1937 |
| 552,321 | Great Britain | Apr. 1, 1943 |

OTHER REFERENCES

Metals Handbook, 1939 edition, pages 922–924, pub. by Amer. Soc. for Metals, Cleveland, Ohio. (Copy in Sci. Library.)